United States Patent [19] [11] Patent Number: 5,771,544
Wier et al. [45] Date of Patent: Jun. 30, 1998

[54] BELT ADJUSTING DEVICE FOR A VEHICLE SAFETY BELT SYSTEM

[75] Inventors: Franz Wier; Peter Haas, both of Göggingen; Edgar Schneider, Schwäbisch Gmünd-Bettringen, all of Germany

[73] Assignee: TRW Occupant Restraint Systems GmbH, Alfdorf, Germany

[21] Appl. No.: 824,228

[22] Filed: Mar. 25, 1997

[30] Foreign Application Priority Data

Apr. 4, 1996 [DE] Germany .................. 296 06 294.4

[51] Int. Cl.$^6$ .................................................. A44B 11/10
[52] U.S. Cl. ................................................ 24/171; 24/196
[58] Field of Search .............................. 24/196, 171, 168, 24/194; 297/483

[56] References Cited

U.S. PATENT DOCUMENTS

| | | | |
|---|---|---|---|
| 3,274,656 | 9/1966 | Hamann | 24/196 |
| 3,293,713 | 12/1966 | Gaylord | 24/196 |
| 3,505,711 | 4/1970 | Carter | 24/196 |
| 3,975,800 | 8/1976 | Farlind | 24/196 |
| 4,228,568 | 10/1980 | Frost et al. | |
| 4,372,012 | 2/1983 | Fohl . | |
| 4,551,889 | 11/1985 | Narayan et al. | 24/171 |
| 4,608,735 | 9/1986 | Kasai | 24/171 |
| 4,871,190 | 10/1989 | Willey | 24/196 |
| 4,876,770 | 10/1989 | Bougher | 24/196 |
| 4,878,272 | 11/1989 | Kotikovsky et al. . | |
| 4,893,874 | 1/1990 | Childress et al. | 24/196 |
| 5,020,193 | 6/1991 | Kunze . | |
| 5,331,726 | 7/1994 | Suh | 24/196 |

FOREIGN PATENT DOCUMENTS

| | | |
|---|---|---|
| 2441542 | 6/1980 | France . |
| 2448909 | 9/1980 | France . |
| 8527732 | 3/1986 | Germany . |

*Primary Examiner*—Peter M. Cuomo
*Assistant Examiner*—Anthony D. Barfield
*Attorney, Agent, or Firm*—Tarolli, Sundheim, Covell, Tummino & Szabo

[57] ABSTRACT

A belt adjusting device comprises a belt webbing having a free end and a tensioned section. The belt adjusting device further comprises a holding part provided with a through passage for a belt webbing and a contact surface adjacent to the through passage. The contact surface is inclined relatively to a plane in which the through passage extends. The belt adjusting device further comprises an arresting part which is movable relatively to the holding part and comprises a deflection web. The deflection web comprises a clamping surface on its side facing the holding part. The belt webbing runs through the through passage, around the deflection web and back through the through passage. The free end of the belt webbing passes through the through passage between an edge of the through passage adjacent the contact surface and the tensioned section of the belt webbing.

6 Claims, 3 Drawing Sheets

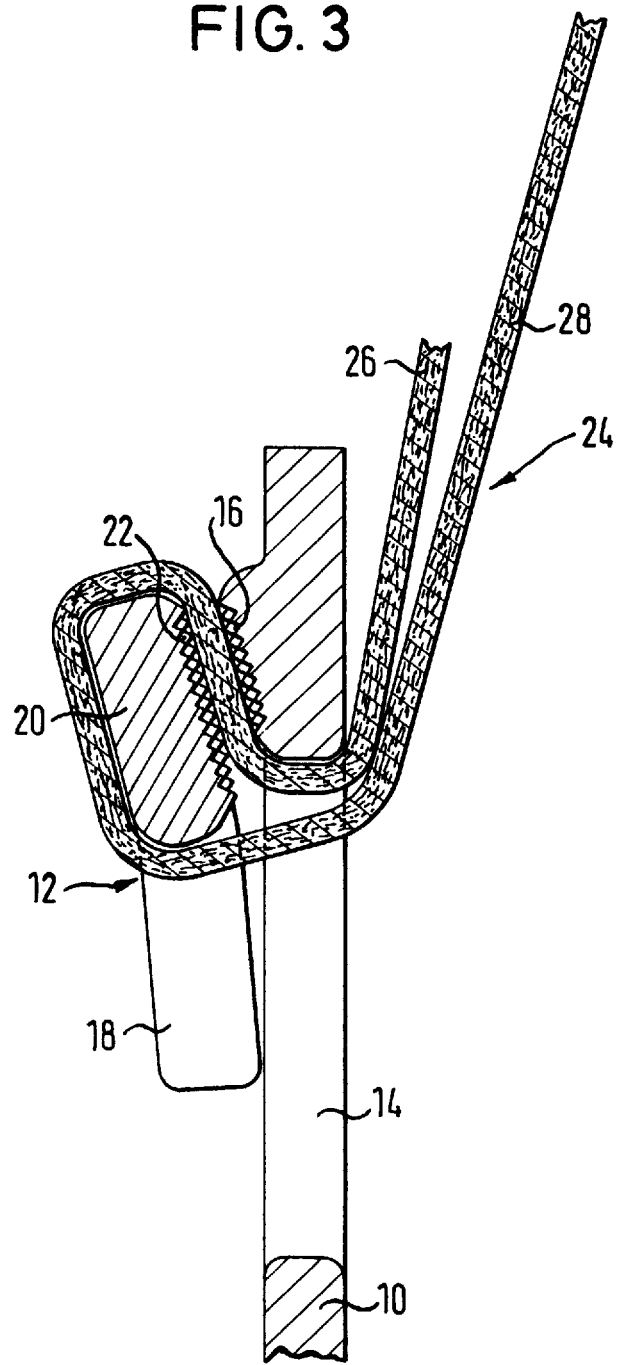

BELT ADJUSTING DEVICE FOR A VEHICLE SAFETY BELT SYSTEM

FIELD OF THE INVENTION

The invention relates to a belt adjusting device for a vehicle safety belt system.

BACKGROUND OF THE INVENTION

A belt adjusting device allows to adapt the available length of the belt webbing, for example between a mounting part and the belt adjusting device, to individual requirements. To do this, the belt adjusting device should on the one hand allow as simple an adjustment as possible of the length of the tensioned section of the belt webbing extending between the belt adjusting device and the mounting part, and, on the other hand, reliably secure the belt webbing when no adjustment is required and a tensile load is exerted on the belt webbing, so that the free end of the belt webbing cannot be drawn through the belt adjusting device. One problem with such belt adjusting devices is that the clamping effect on the belt webbing required to secure the belt webbing also leads to a weakening of the belt webbing at the place where the clamping force is exerted.

BRIEF DESCRIPTION OF THE INVENTION

The invention provides a belt adjusting device which ensures that the belt webbing is clamped reliably and firmly when placed under load without the belt webbing being weakened, and which allows easy adjustment when the belt is in an untensioned state.

The belt adjusting device according to the invention comprises a belt webbing having a free end and a tensioned section. The belt adjusting device further comprises a holding part provided with a through passage for a belt webbing and a contact surface adjacent to the through passage. The contact surface is inclined relatively to a plane in which the through passage extends. The belt adjusting device further comprises an arresting part which is movable relatively to the holding part and comprises a deflection web. The deflection web comprises a clamping surface on its side facing the holding part. The belt webbing runs through the through passage, around the deflection web and back through the through passage. The free end of the belt webbing passes through the through passage between an edge of the through passage adjacent the contact surface and the tensioned section of the belt webbing. This design of the belt adjusting device in accordance with the invention results on the one hand in a particularly easy adjustment of the belt webbing since the belt webbing comes into contact with neither the contact surface nor the clamping surface during the adjustment operation. On the other hand, this design results in a very good clamping effect without weakening of the belt webbing since the contact surface, which is inclined relative to the plane of the through passage, together with the clamping surface and the wraparound of the deflection web by the belt webbing, ensures that any tensile force acting in the belt webbing is transferred into the belt adjusting device in an optimum manner.

Advantageous developments of the invention are given in the sub-claims.

BRIEF DESCRIPTION OF THE DRAWINGS

The invention is described in the following with reference to a preferred embodiment, which is illustrated in the drawing. In this drawing:

FIG. 3 a belt adjusting device in a view corresponding to that of FIG. 2 in a second condition.

DETAILED DESCRIPTION OF THE INVENTION

Figure 1:
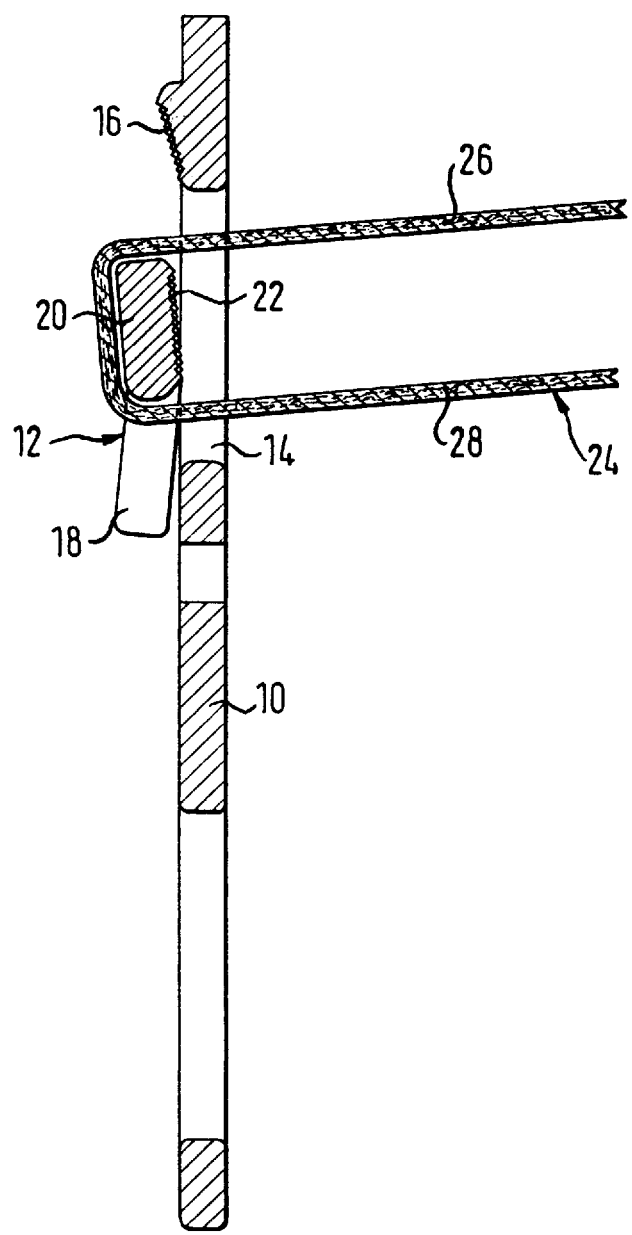
FIG. 1 shows a schematic cross-section through a belt adjusting device in accordance with the invention in a first condition.
Figure 2:
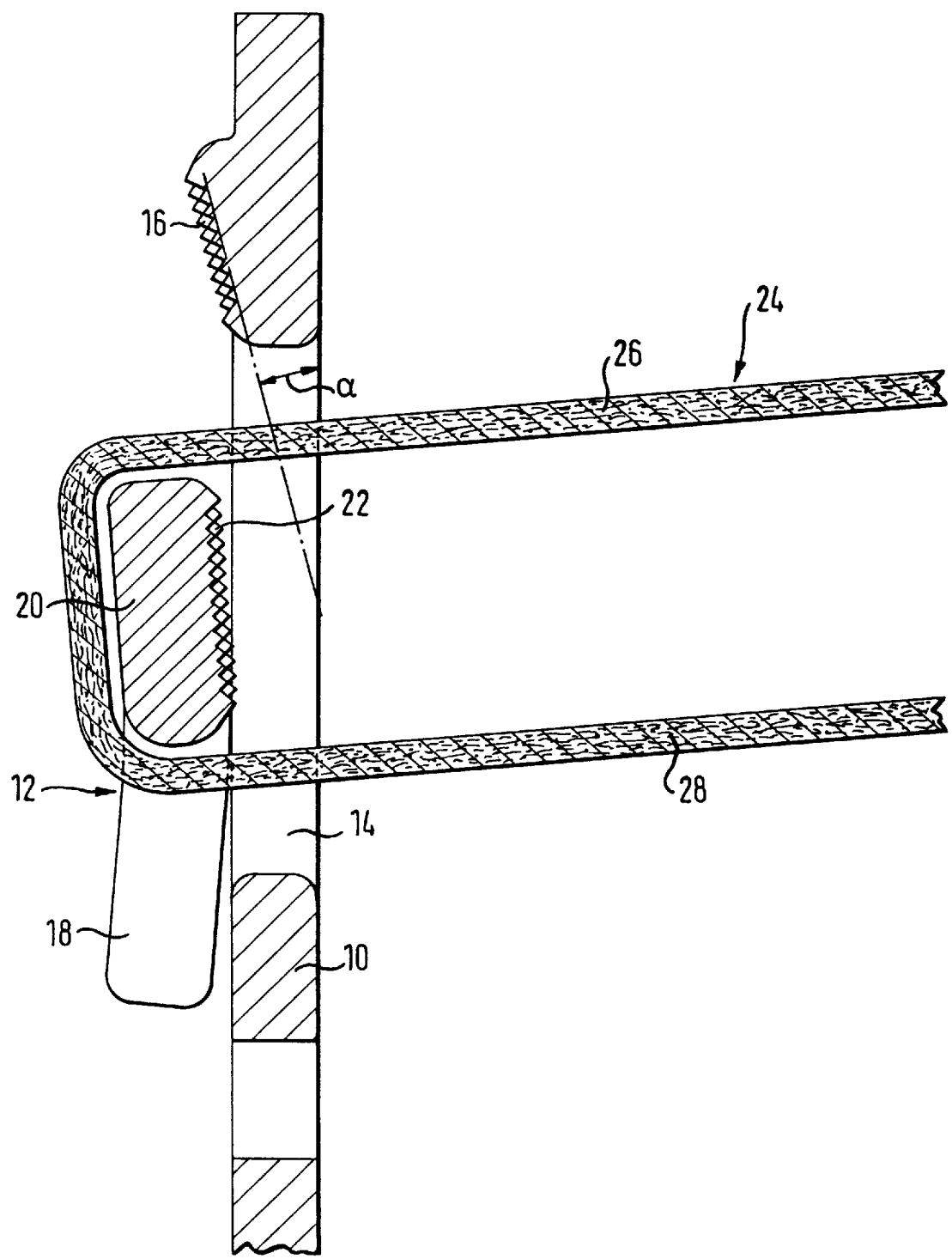
FIG. 2 shows an enlarged partial view of FIG. 1.

FIGS. 1 to 3 illustrate a preferred embodiment of a belt adjusting device in accordance with the invention. In FIGS. 1 and 2, the belt adjusting device is shown in a first condition, in which an adjustment of the length of the tensioned section of belt webbing extending, for example, between a mounting part and the belt adjusting device is possible. In FIG. 3, the belt adjusting device is shown in a second condition in which the belt webbing is securely clamped.

The belt adjusting device in accordance with the invention consists of a holding part 10 and an arresting part 12. The holding part has a through passage 14 for the belt webbing, and adjacent to one edge of this through passage 14 a contact surface 16 which is inclined relatively to the plane of the through passage by an angle a which is preferably approx. 15°, for example.

The arresting part 12 has a supporting section 18 and a deflection web 20. A clamping surface 22 is arranged on the side of the deflection web 20, which faces the holding part 10. The supporting section 18 and the clamping surface 22 extend in planes which are inclined towards each other and which enclose an angle of approx. 170° on the side facing away from the holding part 10. The top surface of the contact surface 16 as well as the top surface of the clamping surface 22 are corrugated.

The belt webbing 24 of the vehicle safety belt system runs through the through passage 14, round the deflection web 20 and back through the through passage 14. Here, the free end 26 of the belt webbing 24 passes through the through passage 14 between the edge of the through passage 14 on the side of the contact surface and the tensioned section 28 of the belt webbing 24.

In the condition of the belt adjusting device in accordance with the invention as illustrated in FIGS. 1 and 2, the belt webbing 24 is wrapped around the deflection web 20 without coming into contact with the contact surface 16 or the clamping surface 22. This allows the length of the tensioned section 28 of the belt webbing to be adapted to the respective requirements particularly easily, for example by pulling out excess belt webbing length between a mounting part and the belt adjusting device by pulling the free end 26 of the belt webbing 24.

In FIG. 3, the belt adjusting device in accordance with the invention is shown in a second state, in which the belt webbing 24 is firmly secured to the belt adjusting device. By means of a tensile load on the tensioned section 28 of the belt webbing 24 in an appropriate direction relatively to the belt adjusting device, the arresting part 12 has been shifted relatively to the holding part 10 in such a way that the clamping surface 22 of the arresting part 12 is located opposite the contact surface 16 of the holding part 10. Due to the inclination of the contact surface 16 relatively to the plane of the through passage 14 and due to the inclination of the clamping surface 22 relatively to the plane of the supporting section 18, a particularly advantageous state of equilibrium results for the arresting part 12. In the event of a tensile load on the tensioned section 28 of the belt webbing 24, the wraparound friction between the belt webbing 24 and the deflection web 20 leads to a movement of the clamping surface 22 towards the contact surface 16. Due to this movement, the belt webbing 24 is securely clamped between the contact surface 16 and the clamping surface 22, whereby, however, the tensile force acting on the belt webbing in the region of the clamping effect between the contact surface 16 and the clamping surface 22 is reduced so much due to the wraparound friction between the belt webbing 24 and the deflection web 20 that the clamping effect does not lead to any weakening of the belt webbing.

The resulting clamping effect between the contact surface 16 and the clamping surface 22 in the belt adjusting device in accordance with the invention is so great that belt webbing with twist-free warp threads or with a friction-reducing coating can be used, without any loss of clamping reliability. Furthermore, belt webbing with lower tensile strength can be used, since no weakening of the belt webbing between the contact surface 16 and the clamping surface 22 occurs due to the particularly gentle clamping process.

We claim:

1. A belt adjusting device for a vehicle safety belt system having a belt webbing with a free end and a tensioned section, said belt adjusting device comprising:

a holding part having a through passage through which the belt webbing extends and a contact surface adjacent said through passage, said contact surface extending in a first plane which extends at an angle of approximately 15° to a second plane in which said through passage extends;

an arresting part which is movable relative to said holding part, said arresting part having a deflection web and a supporting section, said deflection web having a clamping surface facing said holding part and extending in a third plane, said supporting section extending in a fourth plane which extends at an angle between approximately 160° and approximately 175° to the third plane, whereby the belt webbing is adapted to run through said through passage, around said deflection web, and back through said through passage so that the free end of the belt webbing is adapted to pass through said through passage between an edge defining the through passage adjacent said contact surface and the tensioned section of the belt webbing.

2. A belt adjusting device for a vehicle safety belt system comprising a belt webbing having a free end and a tensioned section, a holding-part provided with a through passage for said belt webbing and a contact surface adjacent to said through passage, said contact surface extending in a first plane and being inclined relatively to a second plane in which said through passage extends by an angle of approximately 15°, and an arresting part which is movable relatively to said holding part and comprises a deflection web, said deflection web comprising a clamping surface arranged on a side facing said holding part and extending in a third plane, said arresting part further comprising a supporting section, said supporting section and said clamping surface extending in fourth and third planes, respectively, said third and fourth planes being inclined with respect to each other by an angle between approximately 160° and approximately 175° on a side facing away from said holding part, said belt webbing running through said through passage, around said deflection web and back through said through passage, said free end of said belt webbing passing through said through passage between an edge of said through passage adjacent said contact surface and said tensioned section of said belt webbing.

3. The belt adjusting device of claim 2, wherein said contact surface is provided with a structure which increases friction.

4. The belt adjusting device of claim 3, wherein said contact surface is corrugated.

5. The belt adjusting device of claim 2, wherein said clamping surface is provided with a structure which increases friction.

6. The belt adjusting device of claim 5, wherein said clamping surface is corrugated.

* * * * *